Patented Oct. 6, 1936

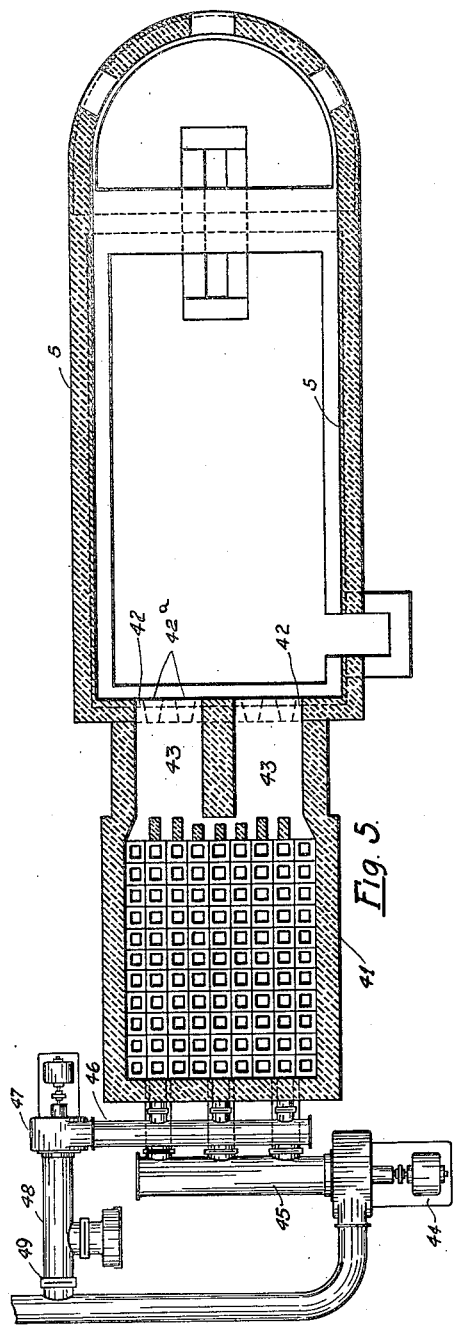
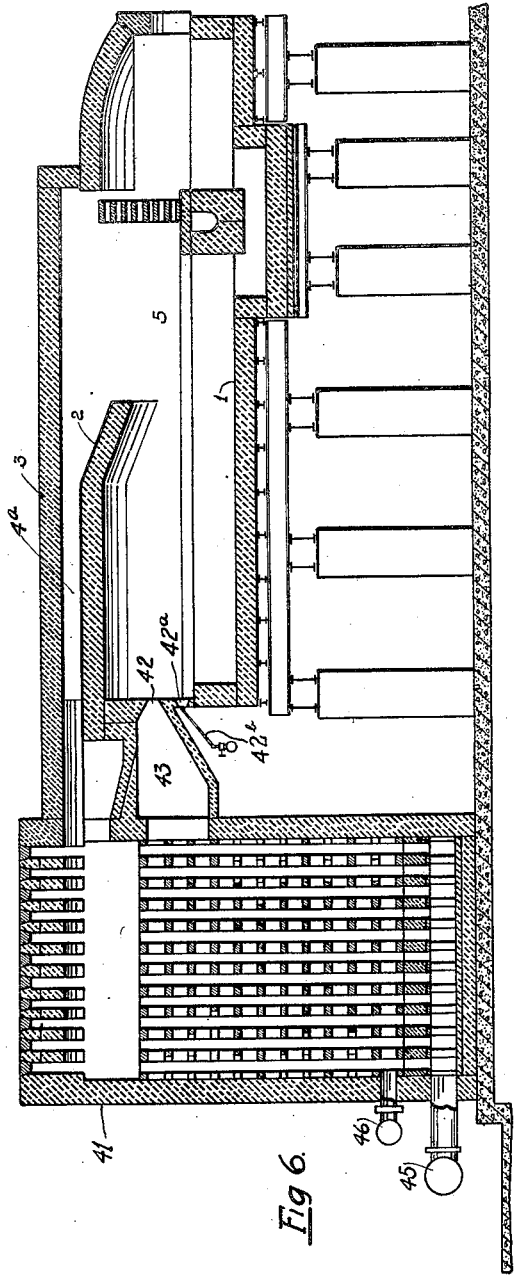

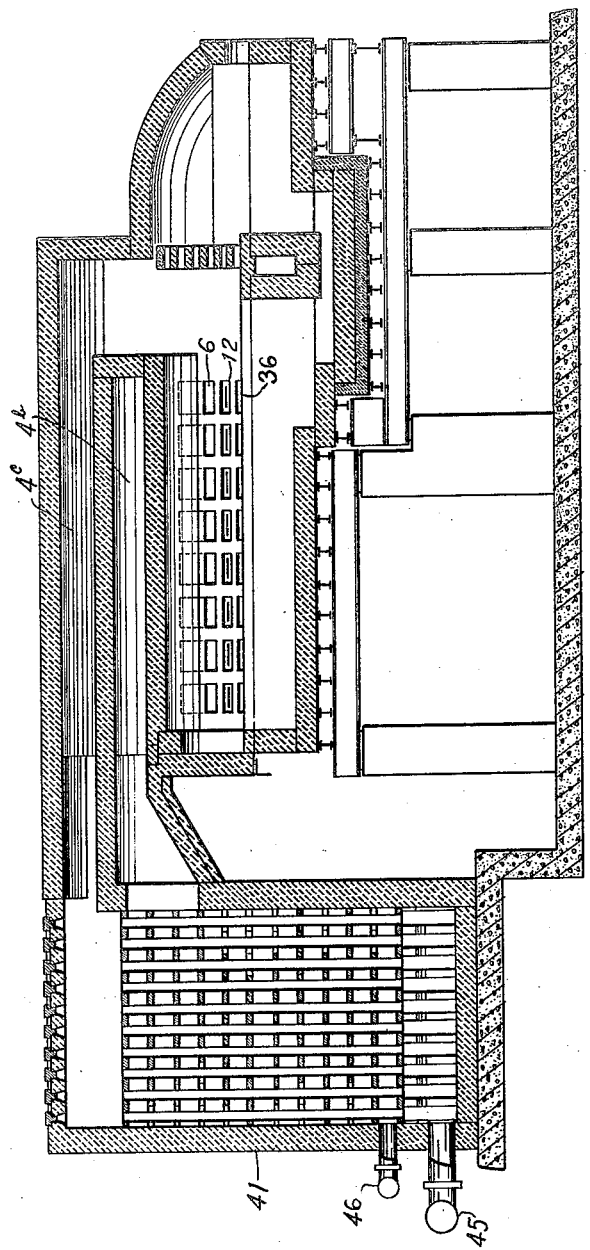

2,056,531

UNITED STATES PATENT OFFICE 2,056,531

PROCESS FOR LUMINOUS FLAME HEATING

William A. Morton, Pittsburgh, Pa., assignor to Amco, Incorporated, Pittsburgh, Pa., a corporation of Pennsylvania Application May 22, 1933, Serial No. 672,119

19 Claims. (Cl. 263—52)

It is recognized in many arts, such, for instance, as those of glass melting and the heat-treatment of steel and other metals or alloys, that much better results are obtained by the use of a highly luminous flame. Thus in the case of heating steel billets, usually termed "soaking", a billet heated by a luminous flame is heated uniformly throughout without excessive oxidation and is readily forgeable, while a billet heated by a non-luminous flame, even though almost dripping when withdrawn, does not forge well.

Natural gas is itself of relatively low luminosity and when mixed with air is highly combustible and explosive. Coke-oven gas is likewise of low luminosity, while a mixed gas like raw producer gas is highly luminous.

Luminosity can not be obtained through the mixing of these gases with air by turbulence.

Inasmuch as the most effective character of heat exchange between two bodies of relatively different temperature is obtainable with a flame of great luminosity or, in other words, a flame carrying the greatest number of incandescent carbon particles as its chief constituent, in accordance with one embodiment of my method I introduce into the furnace independent and spaced apart strata of gas and air, and I regulate the luminosity of the flame by controlling the spacing of the strata, thus regulating the rate of incandescent carbon propagation to vary the luminosity and length of the resultant flame.

Again I control the rate of incandescent carbon propagation by mixing with the fuel gas or preheated air, prior to delivery into the furnace, controlled proportions of burned furnace gas, which latter may be recirculated in a highly heated state from the heating chamber of the furnace, the temperature of the burned furnace gases being above carbonization temperature of the fuel gas.

By controlling the spacing of the strata of air and gas I am able to vary the luminosity and length of the resultant flame, and I am also able to control the luminosity of the flame in the furnace by controlling the proportions of the burned furnace gases mixed with the fuel gas or preheated air, and also by controlling the temperature of such burned furnace gases.

In the accompanying drawings wherein I have illustrated a furnace construction designed for the working of my improved method, Fig. 1 is a partial vertical longitudinal section of the furnace taken along the dotted line 1—1 in Fig. 2.

Fig. 5 is a horizontal section of an end-fired furnace showing means for mixing burned furnace gases with the air as the latter is drawn into the recuperator, and also illustrating my luminous flame heating.

Fig. 6 is a longitudinal, vertical section of the same.

Fig. 7 is a longitudinal vertical section showing a furnace which has the port arrangement along its side walls as described in connection with Figs. 1, 2, 3 and 4 but also having primary and secondary roof arches forming passages for the travel of waste gases and preheated air.

Figure 1:
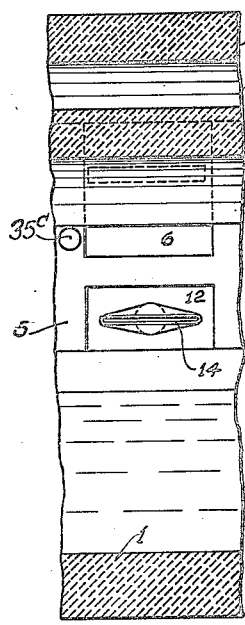
Figure 2:
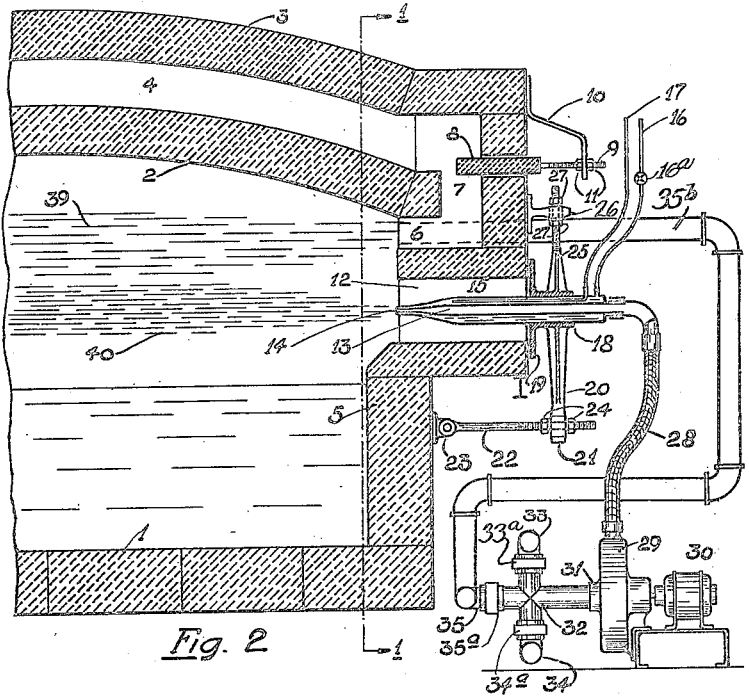
Fig. 2 is a broken cross-sectional view of the furnace taken in a plane at right angles to that of Fig. 1.

Referring first to Figs. 1 and 2, 1 represents the hearth of the furnace, 2 the primary arch, and 3 the roof arch. 4 represents the passage between said arches for the flow of the preheated air from the recuperator. 5 represents one of the side walls of the furnace which is provided with air ports 6 at horizontally spaced intervals, which air ports are connected by the ducts 7 with the air passage 4, each of said ducts being provided with a gate 8 whose position may be adjusted by means of its threaded stem 9 which extends through the bracket 10 and is provided with adjustment nuts 11 on either side of the bracket. These air ports are horizontally elongated as illustrated in the drawings. Below each of the air ports 6 and preferably directly beneath the same is a fuel port 12, also horizontally elongated. Extending into each of the fuel ports 12 is a metal tube 13 whose inner end is flattened and extended horizontally to provide the nozzle 14. The tube 13 is surrounded by the water jacket 15 through which a current of water is caused to pass by means of the valved inlet pipe 16 and the outlet pipe 17. Thus by means of the valve in pipe 16, indicated at 16a, the temperature of the flame may be regulated.

The burner assembly comprising the tube 13 and the water jacket 15 are slidably supported in a sleeve 18 formed as part of a closure plate 19 secured at the outer end of the port 12. The burner assembly may be raised or lowered relative to the port 12, and thereby the elevation of the nozzle 14 relative to the port 12 may be varied. Thus 20 is a depending bar fixed relative to the sleeve 18 and provided at its lower end with an eye 21 through which extends a loosely fitting bolt 22 whose inner end is pivotally attached to the furnace wall 5 as at 23, so as to swing on a horizontal axis. The bolt 22 is threaded and provided with adjustment nuts 24 on either side of the bar 20. Extending upwardly from the sleeve 18 is a second bar 25 whose threaded upper end extends through an eye in the bracket 26, adjustment nuts 27 being provided at either side of the bracket. Thus by adjusting the nuts 24 and the nuts 27 the burner assembly may be raised and lowered relative to the port 12. The extension of the burner assembly into the port 12 may be regulated by sliding the assembly relative to the supporting sleeve 18.

The outer end of the tube 13 is connected, preferably by a flexible tube as at 28, with the discharge of a mixing and induction unit 29, preferably a rotary fan suitably driven as by a motor 30. The inlet 31 of the fan is connected to a T-fitting 32 having connections 33, 34 and 35. The connection 33 is for a supply of fuel gas, such as natural gas, producer gas, coke-oven gas or any other fuel in a gaseous state. The connection 34 is for air. The connection 35 is for waste furnace gases from the furnace which I employ in a highly heated state. Each of these connections is provided with an individual valve or gate, which valves are indicated at 33a, 34a and 35a, respectively.

As a suitable means for supplying the waste furnace gases to the T-fitting 32, I show a pipe 35b connecting a port 35c in the side wall of the furnace with the connection 35 of said T-fitting.

It will be understood that both side walls of the furnace are provided with similar air and gas admission means.

Figure 3:
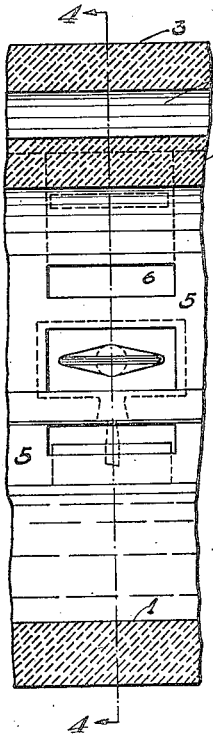
Fig. 3 is a view similar to Fig. 1 but showing a modification, being in section along the line 3—3 in Fig. 4.
Figure 4:
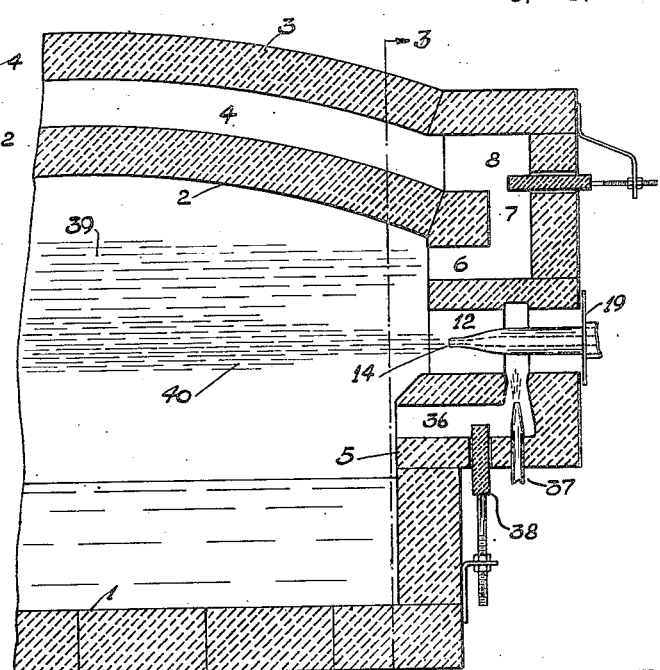
Fig. 4 is a sectional view taken along the line 4—4 in Fig. 3.

In the modification shown in Figs. 3 and 4 the fuel port 12 is connected by a duct 36 with the interior of the furnace for the purpose of leading hot waste furnace gas from the furnace through said duct into the fuel port 12. To inspirate such burned gases I prefer to provide an air jet 37 extending into the duct 36 adjacent to the port 12, compressed air being admitted into the duct 36 to inject the furnace gases into the port 12. To provide for a proper mixture of the burned furnace gases with the fuel gas emitted from the nozzle 14, I adjust the burner assembly relative to the fuel port 12, withdrawing the nozzle within said port to the proper degree to effect the desired mixture. To regulate the admission of burned furnace gases through the duct 36, I provide an adjustable gate or valve 38, whereby the proportion of the burned furnace gas relative to the fuel gas may be varied as required.

It is evident that the preheated air discharged into the furnace assumes the form of a horizontal stratum or strata, indicated by the long horizontal lines 39, while the burning fuel is discharged into the furnace in the form of a stratum or strata, indicated by the short horizontal lines 40 below the strata of air.

The result of this stratification is that there is a slow mixing of the air and the gas, resulting in a slow combustion which produces a highly luminous flame, and the flame thus produced has a greatly extended area with the use of a given volume of fuel and air. The burner assemblies in the various fuel ports along the sides of the furnace may be raised or lowered to vary the spacing between the air and the gas strata, thereby controlling the rate of flame propagation. By regulating the operation of the fan 29, I am able to deliver to the furnace a gas at any desired velocity.

By means of the triple connection of the fuel supply to the burner assemblies I regulate the relative proportions of the fuel gas, air and burnt gases from the furnace, and thus I am able to deliver to the furnace a mixed gas having any desired rate of combustion. Thus if the amount of waste gas mixed with the fuel be increased, the flame length is increased by delaying combustion. Again, if it be desired to vary the velocity of the combustion mixture without altering its combustion rate I increase the volume passing through the burner by adding or increasing the proportion of cold air to the mixture. Thus I am enabled to obtain a constant thermal input in the furnace.

When, as in Figs. 3 and 4, I add highly heated waste gases from the furnace to the fuel mixture by the use of induction means to recirculate such carbon dioxide gases I obtain a high degree of flexibility in the creation of luminous carbon particles in the fuel stream within the furnace by the control of the temperature of the gas stream delivered to the furnace. The hydrocarbons in the fuel gas crack and break down into minute fixed carbon particles at a temperature of about 1500° Fahr., and where it is desired to impart high luminosity virtually at the burner nozzles, I can accomplish this by inducing sufficient furnace gases at high temperature through the duct 36.

It will be noted that I provide independent means for regulating the velocity of gas as it enters the furnace, such means comprising the valves 33a, 34a and 35a of the fitting 32. Moreover by means of the gate 8, I am able to regulate the velocity of the admitted air independently of its volume. By such provision I am able to independently control the velocity of the gas and also of the air to thereby at will vary within wide limits the characteristics of the flame as to length, luminosity and/or temperature, thus producing the desired heating conditions along the full length of and over the entire area of the furnace.

It is to be noted that in my method fuel and air are mixed in the furnace in parallelism and by stratification, thus delaying combustion and increasing the luminosity and therefore the radiation power of the flame.

Where waste furnace gases are mixed with the fuel gas I prefer, as above described, to employ said gases at high furnace temperatures, thus avoiding a thermal loss.

Referring now to Figs. 5 and 6, wherein I illustrate the principles of my invention applied to an end-fired furnace, the wase gases from the furnace travel rearwardly through the roof passage 4a to the upper ends of the vertical flues of the recuperator 41, passing downwardly therethrough. The preheated air enters the furnace from the recuperator through the ducts 43 and the ports 42. Below the air ports 42 are the fuel ports 42a to which the fuel is supplied by the valved pipes 42b.

By this arrangement of air ports and fuel ports in superimposed relation I provide the stratification of the preheated air and fuel for luminous flame heating in accordance with my invention.

The air is injected into the bottom of the recuperator through the pipe connections 46 and the fan 47. The fan is provided with an inlet pipe 48. The preheated air passes from the top of the recuperator into the furnace.

By cross-connecting the waste gases pipe 45 with the inlet pipe 48, waste gases containing carbon dioxide may be mingled with the air before the latter reaches the recuperator, and the proper proportions may be obtained by regulating the gate valve 49 on the gas side of such cross-connection. Thus the proper percentage of carbon dioxide to obtain the desired flame luminosity may be mixed with the air.

This method of mixing burned furnace gas with the air before the latter passes into the recuperator has the additional advantage of conserving and utilizing the heat of the waste gases after their passage through the recuperator.

In Fig. 7, I show a modified form of furnace wherein side-firing is employed and which is provided with a primary and a secondary arch to form superimposed passages 4b and 4c.

The passage 4b is closed at its front end and is connected at its rear end with the recuperator 41 for the travel of the preheated air to the air ports 6 arranged along the furnace wall. The passage 4c is open at its front end to receive the waste furnace gases which it conducts to the top of the waste gas flues of the recuperator.

This view also shows the arrangement along the side walls of the furnace of the preheated air ports 6, the fuel ports 12 and the ducts 36 which supply waste furnace gases to the fuel ports as described in connection with Figs. 3 and 4.

I claim:—

1. The method of producing a controlled luminous flame in an industrial heating furnace which comprises premixing fuel gas and waste gases of combustion, introducing the mixture into the furnace in the form of a stream and maintaining ignition of the same, introducing into the furnace a substantially parallel stream of air in such proximity to the first mentioned stream as to cause diffusion of the streams, and controlling the degree of luminosity of the resulting flame by regulating the rate of diffusion by varying the spacing between the streams at the points of their admission to the furnace.

2. The method of producing a controlled luminous flame in an industrial heating furnace which comprises premixing fuel gas and waste gases of combustion, introducing the mixture in the form of a stream into the furnace and maintaining ignition of the same, introducing into the furnace a substantially parallel stream of air in such proximity to the first mentioned stream as to cause diffusion of the streams, and regulating the degree and extent of luminosity of the resulting flame by controlling the rate of diffusion by varying the spacing between the streams and also by varying the relative velocities of the streams.

3. The method of operating an industrial heating furnace which consists in introducing into the furnace chamber a stratum of fluid fuel and a separate stratum of air in superimposed relation to produce luminous flame heating, introducing burned furance gas to retard combustion, regulating the luminosity of the flame by varying the spacing between the strata, and exposing the materials to be heated to the luminous flame.

4. The method of operating an industrial heating furnace which consists in introducing into the furnace chamber a stratum of fluid fuel and a separate stratum of a combustion-supporting medium in superimposed relation to produce luminous flame heating, regulating the luminosity of the flame by varying the spacing between the strata, and exposing the materials to be heated to the luminous flame.

5. The method of operating an industrial heating furnace which consists in introducing into the furnace chamber a stratum of fluid fuel and a separate stratum of air in super-imposed relation to produce luminous flame heating, introducing burned furnace gas between said strata to retard combustion, regulating the luminosity of the flame by varying the spacing between said strata and by adjusting horizontally the point of introduction of the fuel into the furnace chamber, and exposing the materials to be heated to the luminous flame.

6. The method of operating an industrial heating furnace which consists in introducing into the furnace chamber a stratum of fluid fuel and a separate stratum of air in super-imposed relation to produce luminous flame heating, regulating the luminosity of the flame by varying the velocity of introduction of one of the fluid media and by varying the spacing therebetween, and exposing the materials to be heated to the luminous flame.

7. The method of operating an industrial heating furnace which consists in introducing into the furnace chamber a stratum of fluid fuel and a separate stratum of air in super-imposed relation to produce luminous flame heating, regulating the luminosity of the flame by varying the temperature at which one of the fluid media is introduced into the furnace chamber and by varying the spacing between said strata, and exposing the materials to be heated to the luminous flame.

8. The method of operating an industrial heating furnace which consists in introducing into the furnace chamber a stratum of fluid fuel and a separate stratum of air in super-imposed relation to produce luminous flame heating, exposing the materials to be heated to the luminous flame, and regulating the effect on the materials by varying the height of the flame relative thereto.

9. The method of operating an industrial heating furnace which consists in introducing into the furnace chamber a stratum of fluid fuel and a separate stratum of air in super-imposed relation to produce luminous flame heating, regulating the luminosity of the flame by adding burned furnace gases with one of the fluid media before the introduction of the latter into the furnace chamber and by varying the temperature of the said burned furnace gases and by varying the spacing between said strata, and exposing the materials to be heated to the luminous flame.

10. The method of operating an industrial heating furnace which consists in introducing into the furnace chamber at intervals along its length horizontally disposed strata of fluid fuel and superimposed above the same separate strata of air to produce luminous flame heating, regulating the luminosity and the character of the flames by varying the spacing between the superimposed strata, and exposing the materials to be heated to the luminous flames.

11. The method of operating an industrial heating furnace which consists in introducing into the furnace chamber a stratum of fluid fuel and a separate stratum of air in super-imposed relation to produce luminous flame heating, regulating the luminosity of the flame by introducing burned furnace gas between said strata.

12. The method of operating an industrial heating furnace which consists in introducing into the furnace chamber a stratum of fluid fuel and a separate stratum of air in super-imposed relation to produce luminous flame heating, regulating the luminosity of the flame by introducing burned furnace gas between said strata and by adjusting horizontally the point of introduction of the fuel into the furnace chamber.

13. The method of operating an industrial heating furnace which consists in introducing into the furnace chamber a stratum of fluid fuel and a separate stratum of air in super-imposed relation to produce luminous flame heating, regulating the luminosity of the flame by introducing into the furnace chamber burned furnace gases enveloping the fluid fuel and adjusting horizontally the point of introduction of the fuel into the furnace chamber.

14. The method of operating an industrial heating furnace which consists in introducing into the furnace chamber a stratum of fluid fuel and a separate stratum of air in super-imposed relation to produce luminous flame heating, regulating the luminosity of the flame by introducing burned furnace gas between the strata and by varying the spacing between the strata.

15. The method of operating an industrial heating furnace which consists in introducing into the furnace chamber a stratum of fluid fuel and a separate stratum of air in super-imposed relation to produce luminous flame heating, regulating the luminosity of the flame by introducing into the furnace chamber burned furnace gases enveloping the fluid fuel.

16. The method of operating an industrial heating furnace which consists in introducing into the furnace chamber a stratum of fluid fuel and a separate stratum of air in super-imposed relation to produce luminous flame heating, regulating the luminosity of the flame by introducing, at substantially furnace temperature, into the furnace chamber burned furnace gases enveloping the fluid fuel.

17. The method of operating an industrial heating furnace which consists in introducing into the furnace chamber a stratum of fluid fuel and a separate stratum of air in super-imposed relation to produce luminous flame heating, exposing the materials to be heated to the luminous flame, and regulating the heat effect on the materials by varying the spacing between the strata.

18. The method of operating an industrial heating furnace which consists in introducing into the furnace chamber a stratum of fluid fuel and a separate stratum of a combustion-supporting medium in super-imposed relation to produce luminous flame heating, introducing said media at predetermined relative velocities commensurate with the required demand of heat, and compensating for variations in such demand by adjusting the spacing between said strata to regulate the rate of diffusion between the media.

19. The method of operating an industrial heating furnace which consists in introducing into the furnace chamber at intervals throughout the length thereof a horizontal stratum of fluid fuel and super-imposed thereabove a horizontal stratum of air to produce luminous flame heating throughout the chamber, and regulating the luminosity of the flame at desired zones by introducing controlled amounts of burned furnace gases between the members of pairs of strata, and by varying the vertical spacing between the said members.

WILLIAM A. MORTON.